United States Patent [19]
Kuhn
[11] Patent Number: 4,571,992
[45] Date of Patent: Feb. 25, 1986

[54] METHOD OF DETERMINATION OF SUPPLY START IN INJECTION PUMPS

[75] Inventor: Ulrich Kuhn, Renningen, Fed. Rep. of Germany

[73] Assignee: Robert Bosch GmbH, Stuttgart, Fed. Rep. of Germany

[21] Appl. No.: 315,992

[22] Filed: Oct. 28, 1981

[30] Foreign Application Priority Data

Dec. 13, 1980 [DE] Fed. Rep. of Germany ....... 3047078

[51] Int. Cl.[4] .......... G01M 15/00
[52] U.S. Cl. .......... 73/119 A; 73/168
[58] Field of Search .......... 73/119 A, 49.7, 168

[56] References Cited

U.S. PATENT DOCUMENTS 4,295,364 10/1981 Dooley et al. .......... 73/119 A
4,337,650 7/1982 Brandt .......... 73/119 A
4,362,052 12/1982 Heath et al. .......... 73/119 A

*Primary Examiner*—Jerry W. Myracle
*Attorney, Agent, or Firm*—Michael J. Striker

[57] ABSTRACT

A method of determination of a supply start in an injection pump, includes the steps of blocking an outlet of a pump element, for example, by a valve, supplying a testing medium into the pump element, and determining a supply start upon a pressure increase in the pump element when an upper edge of a pump piston closes a fuel inlet opening of the pump element.

8 Claims, 3 Drawing Figures

METHOD OF DETERMINATION OF SUPPLY START IN INJECTION PUMPS

BACKGROUND OF THE INVENTION

The present invention relates to a method of determination of beginning of supply process in injection pumps.

Recognition of the exact start of the supply in individual pump elements of injection pumps is very important for exact angular position of the cam shafts and thereby is decisive for mounting of the injection pumps on internal combustion engines so as to provide small amount of exhaust gases and low fuel consumption.

It is known to provide a divided sector on an injection pump, which is arranged on a part fixedly connected with the cam shaft of the pump and located inside the housing. There is a means for observing the divided sector with a bore for receiving a removable plug which is formed in the wall of the pump housing opposite to the path of the divided sector during the rotation of the pump. There is also a means for indicating the position of the divided sector which is particularly so arranged that its zone lies against the indicating means in the beginning of the injection for supply pipes of the pump. This construction is not only complicated but is also not very accurate inasmuch as the setting is performed visually which leads to frequent errors. This construction is disclosed, for example, in the German Offenlegungsschrift No. 2,700,878.

SUMMARY OF THE INVENTION

Accordingly, it is an object of the present invention to provide a method of determination of a supply start for injection pumps, which avoids the disadvantages of the prior art.

More particularly, it is an object of the present invention to provide a method which is simple, very accurate, and can be automated.

In keeping with these objects and with others which will become apparent hereinafter, one feature of the present invention resides, briefly stated, in a method of determination of a supply start for injection machines, in accordance with which an outlet of a pump element is blocked, a testing volume is supplied into the pump element, and a supply start is determined upon a pressure increase in the pump element when an upper edge of a pump piston closes a fuel inlet opening of the pump element.

In accordance with another feature of the present invention, the pressure increase may be determined by a pressure sensor arranged in the outlet of the pump element.

A further advantageous feature of the present invention is that an evaluating electronic device can convert the determined pressure into a trigger signal so as to determine thereby an angular position of a cam shaft for the pump piston.

Still a further feature of the present invention is that the testing medium, for example, a fuel replacement is supplied by a hydraulic aggregate.

Finally, the rotary speed of the cam shaft may be retained at lower level, for example, lower than 20 revolutions per minute.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
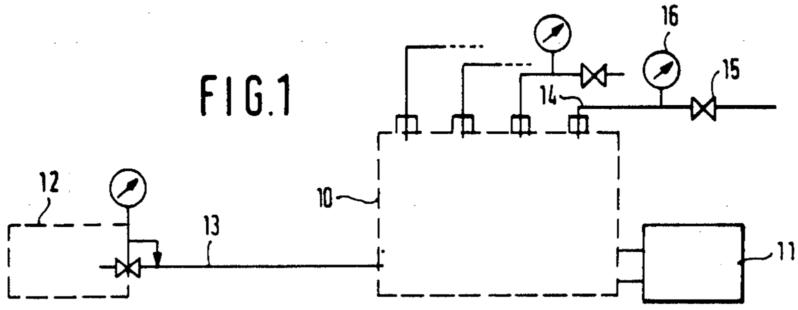
FIG. 1 is a view which schematically shows an injection pump with a measuring device.

FIG. 1 shows an injection pump, particularly a diesel injection pump, which is identified by reference numeral 10. The injection pump 10 is driven by a suitable drive machine 11 with relatively low rotary speed, for example, smaller than 20 revolutions per minute. A hydraulic aggregate 12 supplies a liquid testing medium (substitute fuel) via conduit 13 to the injection pump. It has in the shown example four cylinders. An outlet conduit 14 is connected with each cylinder and provided with a switch valve 15. Each switch valve is preceded by a pressure sensor 16, for example a piezoresistant pressure sensor.

Figure 2:
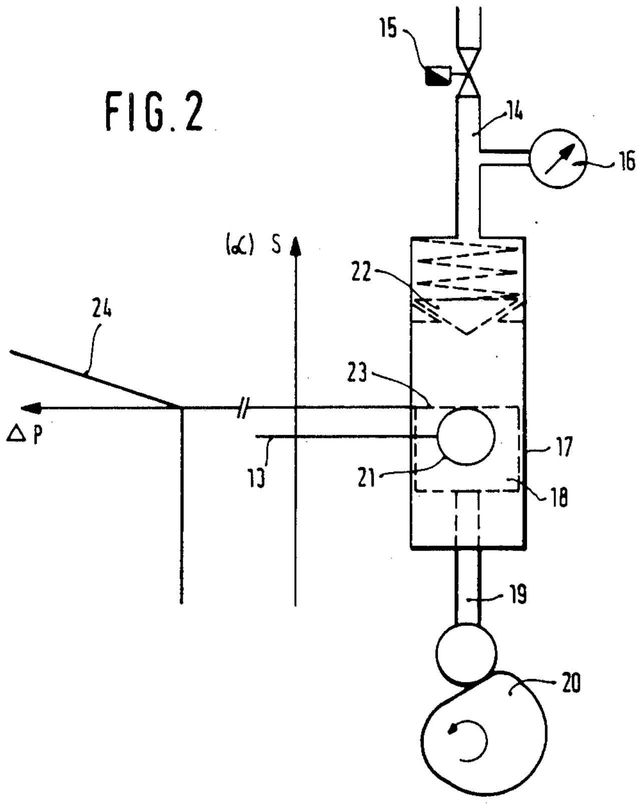
FIG. 2 is a view which schematically shows an individual cylinder of an injection pump.
Figure 3:
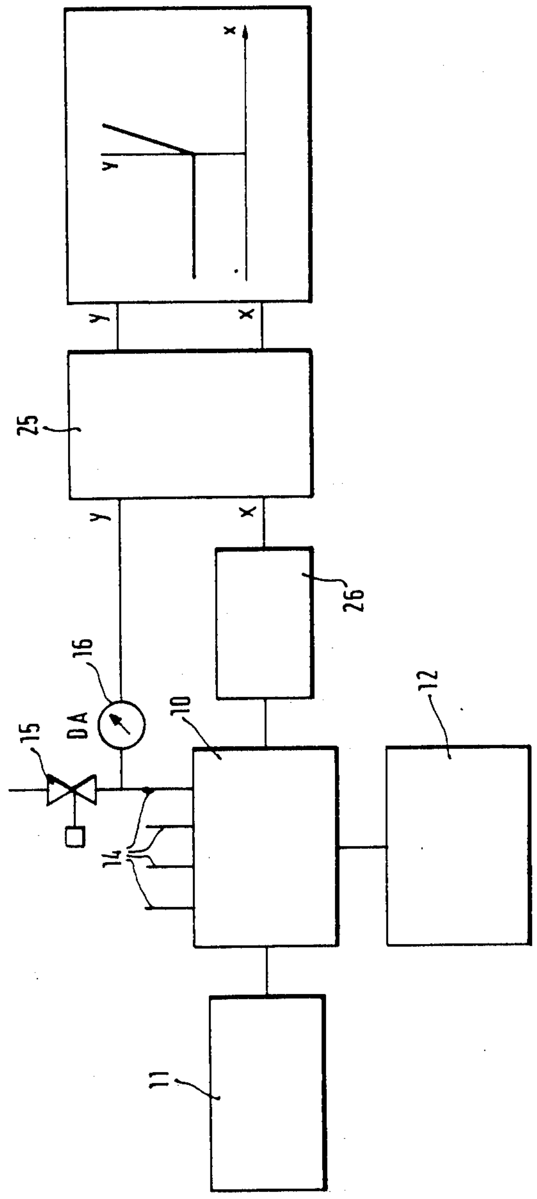
FIG. 3 is a view showing an arrangement for performing the inventive method.

FIG. 2 shows an individual cylinder of the injection pump. A pump piston 18 is actuated via a rod 19 from a cam shaft 20. The conduit 13 is connected with an inlet bore 21 provided in the cylinder bore. A return valve 22 is arranged in the cylinder. When the testing starts, the outlet conduit 14 is blocked by the switch valve 15. As soon as an upper edge 23 of the pump piston 18 directly closes the bore 21, the injection pump starts the supply and the pressure increases. This is indicated in the diagram by a line 24. Thereby, the start of the supply of the injection pump can be exactly determined by the pressure increase. The pressure increase is sensed by the pressure sensor 16 and supplied to an electronic evaluating device 25. Then the signal can be converted into a trigger signal corresponding to the supply start, and the associated angular position of the cam shaft of the injection pipe can be identified by this trigger signal. Reference numeral 26 in FIG. 3 identifies an angular transducer for the position of the cam shaft 20.

Since the crank shaft 20 operates with a low rotary speed, the process is quasi static which is advantageous for the measuring accuracy. After the attained pressure increase, the switch valve 15 opens so that the compressed testing medium can be discharged. Then it is again closed.

It will be understood that each of the elements described above, or two or more together, may also find a useful application in other types of constructions differing from the types described above.

While the invention has been illustrated and described as embodied in a method of determination of a supply start or injection pumps, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of determination of a supply start in an injection pump, particularly Diesel injection pump, comprising the steps of blocking an outlet of a pump element; supplying a testing volume into the pump element; and determining a supply start upon a pressure increase in the pump element when an upper edge of a pump piston closes a fuel inlet opening of the pump element.

2. A method as defined in claim 1, wherein said blocking step includes blocking the outlet of the pump element by a valve.

3. A method as defined in claim 1, wherein said determining step includes determining the pressure increase by a pressure sensor arranged in the outlet.

4. A method as defined in claim 1, wherein said determining step includes converting the determined pressure by an evaluating electronic device into a trigger signal so as to determine thereby an angular position of a cam shaft for the pump piston.

5. A method as defined in claim 1, wherein said supplying step includes supplying a testing medium by a hydraulic aggregate.

6. A method as defined in claim 1, wherein said supplying step includes supplying a fuel replacement as the testing medium.

7. A method as defined in claim 1; and further comprising the step of retaining the rotary speed of a cam shaft for the pump piston at a lower level.

8. A method as defined in claim 7, wherein said retaining step includes retaining the rotary speed of the cam shaft lower than 20 revolutions per minute.

* * * * *